US011372012B2

(12) United States Patent
Iwasaki et al.

(10) Patent No.: US 11,372,012 B2
(45) Date of Patent: Jun. 28, 2022

(54) DISPENSING ROBOT, METHOD OF CONTROLLING DISPENSING ROBOT, AND DISPENSING METHOD

(71) Applicants: KAWASAKI JUKOGYO KABUSHIKI KAISHA, Kobe (JP); SYSMEX CORPORATION, Kobe (JP)

(72) Inventors: Yukio Iwasaki, Kobe (JP); Satoshi Ouchi, Kobe (JP); Eiji Mitsui, Kobe (JP); Junichi Matsuoka, Kobe (JP); Hiroya Kirimura, Kobe (JP); Yukihiko Kitano, Kobe (JP)

(73) Assignees: KAWASAKI JUKOGYO KABUSHIKI KAISHA, Kobe (JP); SYSMEX CORPORATION, Kobe (JP)

(*) Notice: Subject to any disclaimer, the term of this patent is extended or adjusted under 35 U.S.C. 154(b) by 256 days.

(21) Appl. No.: 16/228,946

(22) Filed: Dec. 21, 2018

(65) Prior Publication Data

US 2019/0195901 A1 Jun. 27, 2019

(30) Foreign Application Priority Data

Dec. 26, 2017 (JP) .............................. JP2017-250247

(51) Int. Cl.
*G01N 35/00* (2006.01)
*G01N 35/10* (2006.01)
*B01L 3/02* (2006.01)

(52) U.S. Cl.
CPC ........ *G01N 35/0099* (2013.01); *B01L 3/0279* (2013.01); *G01N 35/1011* (2013.01);
(Continued)

(58) Field of Classification Search
CPC ........... G01N 35/0099; G01N 35/1011; G01N 2035/1013; G01N 35/1065;
(Continued)

(56) References Cited

U.S. PATENT DOCUMENTS 4,013,104 A * 3/1977 Sexton .................. G01F 11/021
141/18
2005/0178795 A1* 8/2005 Inoue ................. G01N 35/1009
222/23
(Continued)

FOREIGN PATENT DOCUMENTS

JP 2005-172490 A 6/2005
JP 2008-012456 A 1/2008
(Continued)

OTHER PUBLICATIONS

The Office Action dated Nov. 16, 2021 in a counterpart Japanese patent application, with English translation.

*Primary Examiner* — Jill A Warden
*Assistant Examiner* — John McGuirk
(74) *Attorney, Agent, or Firm* — Metrolex IP Law Group, PLLC (57) ABSTRACT

A dispensing robot of an assay robot system includes a first contact surface oriented in a downward direction or an obliquely downward direction in a vertical direction and dispenses when the dispensing robot operates a pipette that allows a tip to be attached to a lower end of the pipette and the attached tip to be detached by pressing a tip ejector, the dispensing robot comprising: a robot arm having a hand to hold a pipette holding piece attached thereto; and a controller controls the robot arm such that the robot arm holds the pipette with the tip attached thereto by causing the hand to hold the pipette holding piece and that the robot arm is elevated and the tip ejector is pressed by bringing an upper (Continued)

end portion of the tip ejector of the held pipette into contact with the first contact surface from the downward direction.

8 Claims, 11 Drawing Sheets

(52) U.S. Cl.
CPC . *B01L 2200/143* (2013.01); *B01L 2300/0654* (2013.01); *G01N 35/1065* (2013.01); *G01N 2035/103* (2013.01)

(58) Field of Classification Search
CPC ............. G01N 2035/103; B01L 3/0279; B01L 3/0275; B01L 200/143; B01L 2300/0654
See application file for complete search history.

(56) References Cited

U.S. PATENT DOCUMENTS

| | | | |
|---|---|---|---|
| 2009/0081081 A1* | 3/2009 | Kowari | B01L 9/543 422/63 |
| 2014/0106386 A1* | 4/2014 | Umeno | B25J 9/0087 435/23 |
| 2014/0272989 A1* | 9/2014 | Knight | G01N 35/0099 435/6.12 |
| 2018/0074027 A1* | 3/2018 | Kim | G01N 35/109 |
| 2020/0319219 A1* | 10/2020 | Vansickler | G01N 35/0092 |

FOREIGN PATENT DOCUMENTS

| | | |
|---|---|---|
| JP | 2012-117880 A | 6/2012 |
| JP | 2013-009618 A | 1/2013 |
| JP | 2015-085490 A | 5/2015 |
| JP | 2017-161517 A | 9/2017 |

* cited by examiner

DISPENSING ROBOT, METHOD OF CONTROLLING DISPENSING ROBOT, AND DISPENSING METHOD

CROSS REFERENCE TO RELATED APPLICATIONS

This application claims priority based on 35 USC 119 from prior Japanese Patent Application No. 2017-250247 filed on Dec. 26, 2017, entitled "DISPENSING ROBOT, METHOD OF CONTROLLING DISPENSING ROBOT, AND DISPENSING METHOD", the entire contents of which are incorporated herein by reference.

BACKGROUND

The present disclosure relates to a dispensing robot, a method of controlling a dispensing robot, and a dispensing method.

Conventionally, pipettes have been used to dispense a small amount of liquid in laboratories in the fields of physicochemistry and medical science. Such dispensing work using a pipette is often carried out by a human manipulating a manual type pipette. As explained in Japanese Patent Application Publication No. 2008-012456, for example, this type of pipette is configured such that a tip is allowed to be attached to its lower end and the attached tip is allowed to be detached. In addition, in this type of pipette, the operable part of the plunger and the operable part of the tip ejector are located at the upper end portion of the pipette so that, while gripping a pipette, a human easily aspirates and discharges the dispensing target liquid with the plunger and detaches the tip with the tip ejector. The tip ejector is configured such that when its operable part is pressed, the tip attached to the lower end of the pipette is detached from the pipette.

In recent years, there is a demand in the industrial world for robots to carry out work which has been performed by humans. Such demand also exists in dispensing work. In this case, there is a demand for using commercially available manual type pipettes from the viewpoint of operating costs and usage records.

The present invention has been made to solve such a problem and aims to provide a dispensing robot, a method of controlling a dispensing robot, and a dispensing method which make it possible to dispense using a commercially available manual type pipette.

SUMMARY

In accordance with one or more embodiments, a dispensing robot of an assay robot system that includes a first contact surface oriented in a downward direction or an obliquely downward direction in a vertical direction and that dispenses when the dispensing robot operates a pipette that allows a tip to be attached to a lower end of the pipette and the attached tip to be detached by pressing a tip ejector, the dispensing robot comprising: a robot arm that includes a hand to hold a pipette holding piece attached to the pipette; and a controller that controls operation of the robot arm, wherein the controller controls the robot arm such that the robot arm holds the pipette with the tip attached thereto by causing the hand to hold the pipette holding piece and that the robot arm is elevated and the tip ejector is pressed by bringing an upper end portion of the tip ejector of the held pipette into contact with the first contact surface from the downward direction.

In accordance with one or more embodiments, a method of controlling a dispensing robot of an assay robot system that includes a first contact surface oriented in a downward direction or an obliquely downward direction in a vertical direction and that dispenses when the dispensing robot operates a pipette that allows a tip to be attached to a lower end of the pipette and the attached tip to be detached by pressing a tip ejector, the dispensing robot including a robot arm that includes a hand to hold a pipette holding piece attached to the pipette; and a controller that controls operation of the robot arm, wherein the method of controlling a dispensing robot comprises: causing the controller to control the robot arm such that the robot arm holds the pipette with the tip attached thereto by causing the hand to hold the pipette holding piece and that the robot arm is elevated and the tip ejector is pressed by bringing an upper end portion of the tip ejector of the held pipette into contact with the first contact surface from the downward direction.

In accordance with one or more embodiments, a dispensing method comprising: holding a pipette holding piece attached to a pipette with a hand of a robot arm; attaching a tip to the pipette by moving the pipette so as to insert the pipette to the tip; dispensing liquid using the pipette to which the tip is attached; and detaching the tip used for dispensing the liquid from the pipette by moving the pipette to as to bring a tip ejector of the held pipette to come into contact with a contact member.

DETAILED DESCRIPTION

Hereinafter, one or more embodiments of the disclosure are described with reference to the attached drawings. Note that in the following, the same or corresponding elements are denoted by the same reference numerals throughout all drawings, and duplicate explanations are omitted. In addition, the attached drawings are drawings for explaining one or more embodiments. For this reason, there are, for example, a case where elements irrelevant to one or more embodiments are omitted, a case where the dimensions are inaccurate due to exaggeration, a case of simplification, and a case where the shapes of the same elements do not match in the multiple drawings.

Embodiment 1

[Configuration]

Figure 1:
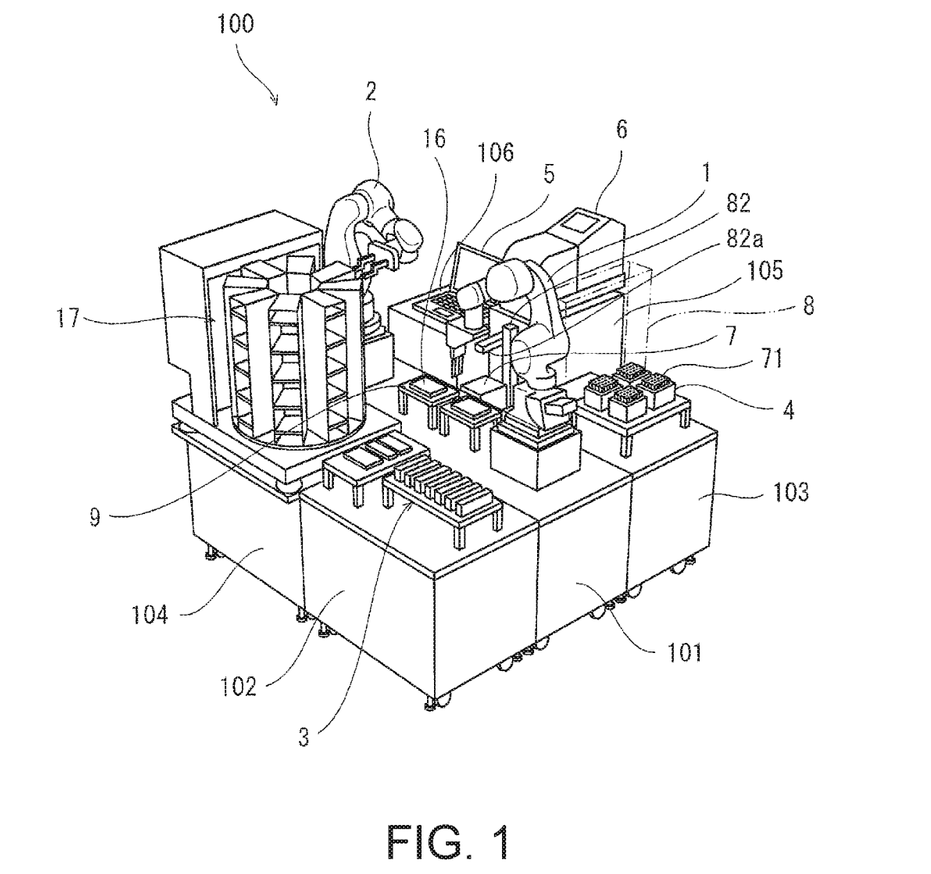
FIG. 1 is a diagram illustrating a perspective view of an overview of an assay robot system for which a dispensing robot is used according to one or more embodiments.

FIG. 1 is a perspective view illustrating an overview of an assay robot system for which a dispensing robot according to one or more embodiments is used.

<Assay Robot System>

Reference to FIG. 1 shows that an assay robot system 100 of Embodiment 1 includes a robot module 101, a reagent module 102, a tip module 103, a plate stocker module 104, a measuring instrument module 105, a control module 106, a trash box 7, a pipette rack 8, and a first contact member 82. Each of the modules 101 to 106 is provided with a dedicated cart. These carts are connected to one another with connecting tools. In addition, the assay robot system 100 is covered by a rectangular parallelepiped transparent case (not illustrated) whose lower end is opened.

As for the robot module 101, a dispensing robot 1 and a transporting robot 2 are provided on the cart with a space in between. Here, to be precise, a robot arm of the dispensing robot 1 and a robot arm of the transporting robot 2 are provided on the cart. Each of the dispensing robot 1 and the transporting robot 2 includes the corresponding robot arm and a controller which controls the operation of the robot arm. These controllers are provided inside the cart. A work stage 9 on which a plate 16 is mounted is provided between the dispensing robot 1 and the transporting robot 2. The plate 16 includes two types of plates, a sample plate in which samples are placed and analysis plate such as ELISA (enzyme-linked immunosorbent assay) plate.

In the reagent module 102, a reagent reservoir 3 is placed on the cart. In the tip module 103, multiple tip racks 4 are placed on the cart. Each of the tip racks 4 has multiple tips 71 placed uprightly therein. In the plate stocker module 104, a plate stocker 17 is provided on the cart. The plate stocker 17 has the above-described two types of plates 16 stored thereon.

In the measuring instrument module 105, a measuring instrument (not illustrated) and a washer 6 are provided on the cart. In the control module 106, an input/output device 5 of the measuring instrument of the measuring instrument module 105 is provided on the cart. The input/output device 5 may be, for example, a personal computer.

<Pipette>

Figure 3A:
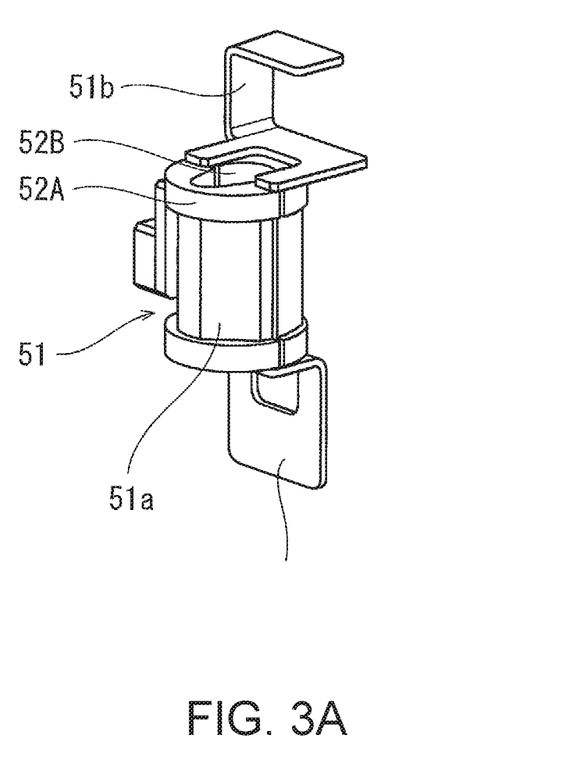
FIG. 3A is a diagram illustrating a perspective view of the configuration of a pipette holding piece.
Figure 3B:
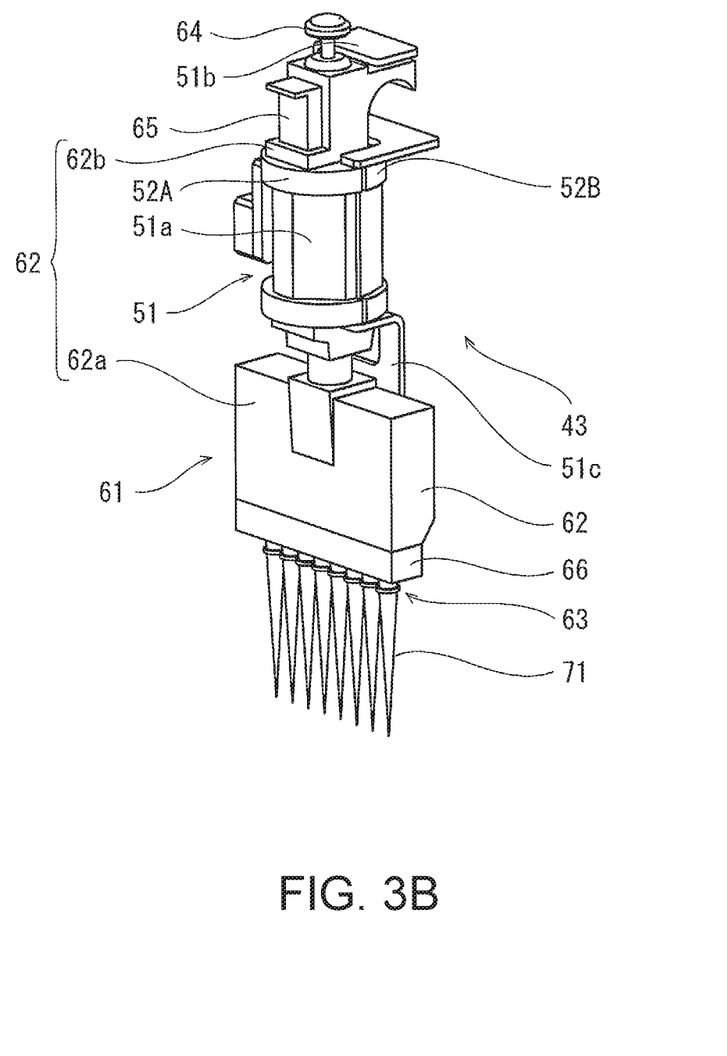
FIG. 3B is a diagram illustrating a perspective view of a pipette having a pipette holding piece, such as in FIG. 3A, attached thereto and having pipette tips attached thereto.

FIG. 3A is a perspective view illustrating the configuration of the pipette holding piece. FIG. 3B is a perspective view illustrating a pipette having the pipette holding piece of FIG. 3A attached thereto and having pipette tips attached thereto. In FIG. 3A and FIG. 3B, the up-down direction in the figures is taken as the up-down moving direction of the hand for convenience of explanation.

Reference to FIG. 3B shows that a commercially available manual type pipette is used as a pipette 61. As the pipette 61, for example, ones manufactured by Rainin (Mettler Toledo), manufactured by Eppendorf, manufactured by Nichiryo, and manufactured by Gilson may be used.

Here, the pipette 61 is an 8-channel type pipette configured such that eight pipette tips (tips) 71 are attachable. Note that the number of channels is not limited. As illustrated in FIG. 3B, the pipette 61 has, in an upright position, tips 71 attached to the lower end thereof and is configured such that the attached tips 71 can be detached when the tip ejector 65 is pressed. Specifically, the pipette 61 has a shape extending in the up-down direction as a whole and has a main body 62. The main body 62 has a head portion 62a. A grip portion 62b is located above the head portion 62a. The head portion 62a and the grip portion 62b are connected together with a member which is not illustrated. The head portion 62a is hollow, and eight cylindrical tip attachment members 63 extend from the lower end of the head portion 62a. The distal end portion (lower end portion) of each of the tip attachment members 63 is formed as a reduced diameter portion, and the upper end portion of the pipette tip 71 is press-fitted to and mounted on this reduced diameter portion. The proximal ends of the eight tip attachment members are connected to a not-illustrated cylinder. A not-illustrated piston is provided inside the cylinder. The lower end portion of the plunger 64 is connected to the piston. The grip portion 62b is hollow, and the plunger 64 penetrates the grip portion 62b and extends from the upper end of the grip portion 62b. The upper end portion of the plunger 64 is formed as an operable part. A driven gear 44b of a plunger driver 44 comes into contact with this operable part. For example, the plunger 64 is biased upward by a compression spring (not illustrated) in a non-pressed state, and upward movement is restrained by a stopper (not illustrated). As a result, the plunger 64 descends when pressed and ascends due to the compression spring when the press is released. As the plunger 64 ascends, the dispensing target liquid is aspirated into the pipette tips 71. As the plunger 64 descends, the dispensing target liquid is discharged from the pipette tips 71.

Figure 3C:
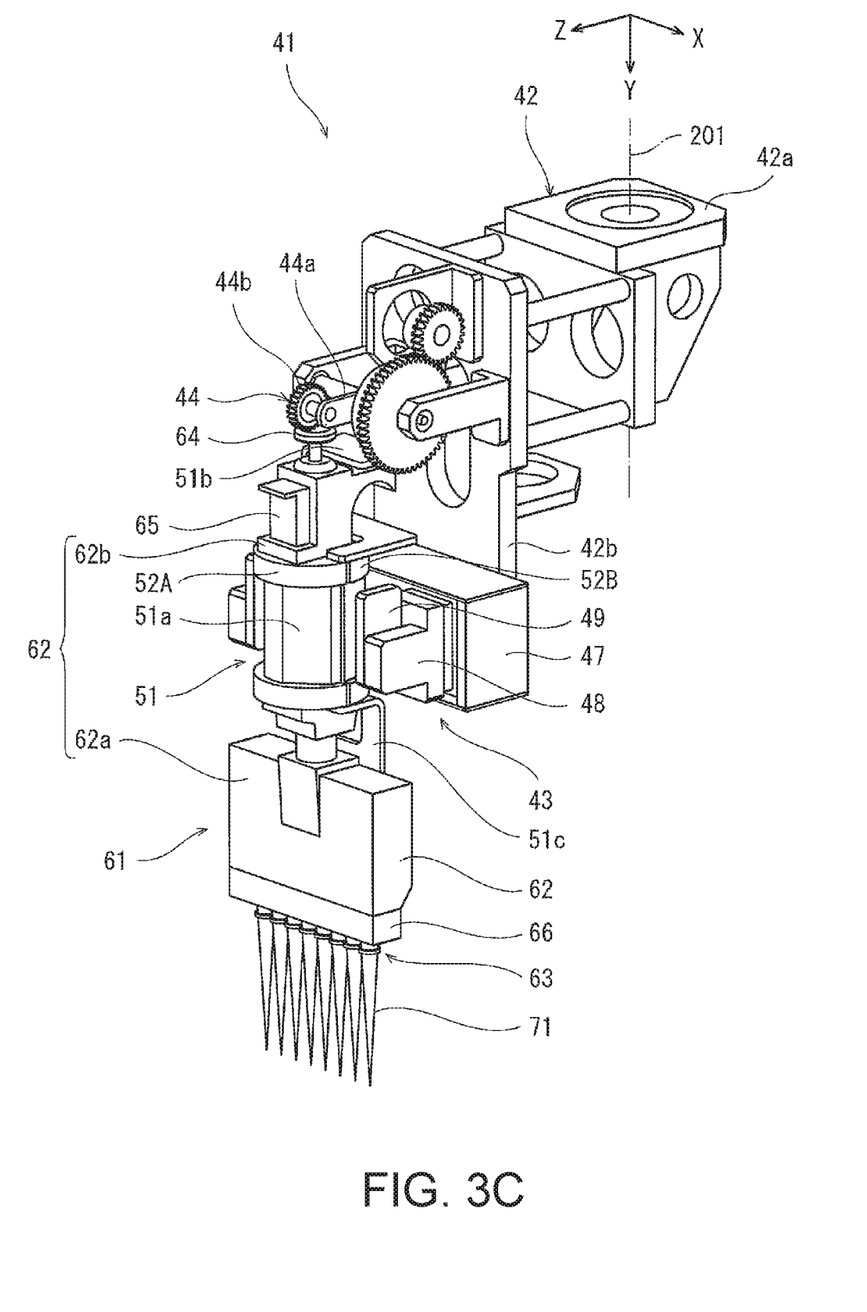
FIG. 3C is a diagram illustrating a perspective view of a state where a pipette holding piece is attached to and pipette tips are attached to a hand of a dispensing robot, such as in FIG. 1.
Figure 3D:
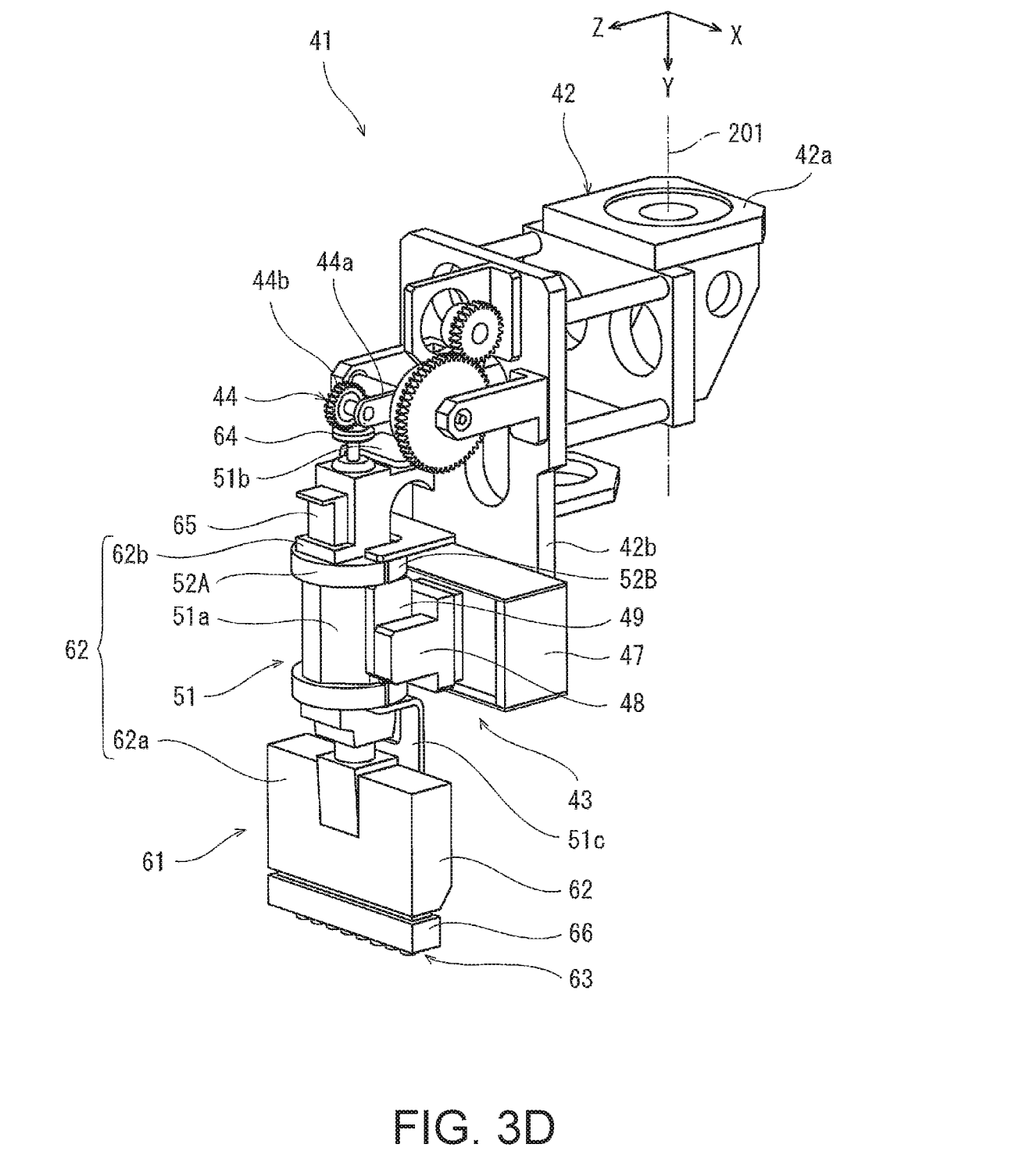
FIG. 3D is a diagram illustrating a perspective view of a state where a tip ejector of a pipette, such as in FIG. 3C, has been pressed downward to detach pipette tips from the pipette.

On the lower side of the head portion 62a, a tubular pushing member 66 having a rectangular cross-section is fitted into the eight tip attachment members with gaps in between so as to freely move up and down. The pushing member 66 is connected to the ejector 65 via a link member. The ejector 65 penetrates the grip portion 62b and extends from the upper end of the grip portion 62b. The upper end portion of the ejector 65 is formed as an operable part. For example, the ejector 65 is biased upward by a compression spring (not illustrated) in a not-pressed state, and upward movement is restrained by a stopper (not illustrated). The ejector 65 descends when pressed and ascends due to the compression spring when the press is released. On the other hand, the pushing member 66 descends when the ejector 65 is pressed and presses the upper end portions of the pipette tips 71 attached to the tip attachment members 63. As a result, the pipette tips 71 are detached from the tip attachment members 63, as illustrated in FIG. 3D. Then, when press is released, ejector 65 returns to its original position. This also returns the pushing member 66 to its original position.

<Pipette Holder>

A pipette holding piece 51 is included in the dispensing robot 1 or the assay robot system 100.

Reference to FIGS. 1 and 3B shows that the assay robot system 100 includes a pipette rack 8, as illustrated by the two-dot chain lines in FIG. 1. The pipette rack 8 is provided, for example, near the trash box 7 and the dispensing robot 1. The pipette rack 8 has any shape. The pipette 61 having the pipette holding piece 51 attached thereto is mounted on the pipette rack 8, as illustrated in FIG. 3B. Here, the pipette rack 8 is mounted with multiple pipettes 61 with different volumes. The pipette rack 8 is configured such that a robot arm 11 can hold (attach) the pipettes 61 by gripping the pipette holding piece 51 of the pipettes 61 with a hand 41 and that the robot arm 11 can release the pipettes 61 gripped (held) by the hand 41 and mount the pipettes 61 at a predetermined position of the rack. As described above, the dispensing robot 1 or the assay robot system 100 includes the pipette holding piece 51 in a manner attached to the pipettes 61.

Reference to FIGS. 3A and 3B shows that the pipette holding piece 51 includes a main holder 51a, an upper auxiliary holder 51b, and a lower auxiliary holder 51c. The pipette holding piece 51 is designed such that it fits to the individual commercially available manual type pipettes 61, that the pipettes 61 are allowed to engage with the main holder 51a, and that the end effector attached to the robot arm 11 can hold them.

The main holder 51a is a portion which holds the lower portion of the grip portion 62b of the pipette 61 and is a portion held by a pipette holder 43 of the hand 41.

The main holder 51a includes a pair of semi-cylindrical members 52A and 52B. This pair of semi-cylindrical members 52A and 52B are formed to form a cylindrical shape as a whole when circumferential end surfaces of the semi-cylindrical members 52A and 52B are arranged to face each other with small gaps. Hereinafter, for convenience, the pair of semi-cylindrical members 52A and 52B which are arranged to face each other in this way are abbreviated as "facing members 52A and 52B." In the facing members 52A and 52B, the upper end portion and the lower end portion are formed in a short cylindrical shape, and the portion located between the upper end portion and the lower end portion of this short cylinder is formed in an octagonal pillar shape. As a result, when gripped by a pair of contact members 49 of a pair of claw members 48 of the pipette holder 43 of the hand 41, the attitude is accurately determined in the peripheral direction of the pipette 61. In addition, the internal space of the facing members 52A and 52B is formed to have an inner peripheral shape corresponding to the outer peripheral shape of the portion where the main holder 51a of the grip portion 62b of the pipette 61 is attached. Thus, the main holder 51a is adapted to the shape of the commercially available pipette 61. Moreover, the dimension between the upper end portion and the lower end portion of the facing members 52A and 52B is designed as a dimension slightly larger than the dimension in the Y-axis direction of the pair of plate-shaped contact members 49 provided on the respective inner surfaces of the pair of claw members 48 of the pipette holder 43 of the hand 41. Furthermore, the facing members 52A and 52B are designed such that the gap between the end surfaces facing each other is located on the side surface of the grip portion 62b of the pipette 61 and is located at the middle portion of the side surface of the octagonal pillar part. Thereby, as described later, the front face of the pipette 61 faces forward when the pair of semi-cylindrical members 52A and 52B are mounted on the pipette 61 and held by the hand 41 as the facing members 52A and 52B as illustrated in FIG. 3C.

Here, the design is made such that the semi-cylindrical member 52A is located in the front half of the grip portion 62b of the pipette 61, and the semi-cylindrical member 52B is located in the rear half of the grip portion 62b of the pipette 61.

The pair of semi-cylindrical members 52A and 52B are fastened with multiple predetermined fastening members (not illustrated) after they sandwich a predetermined portion of the lower end portion of the grip portion 62b of the pipette 61 and the circumferential end surfaces of the semi-cylindrical members 52A and 52B are arranged to face each other with a predetermined gap.

The upper auxiliary holder 51b is formed in a shape along the shape of the upper portion of the grip portion 62b of the pipette 61, and is fastened to support the upper portion of the grip portion 62b with multiple predetermined fastening members (not illustrated) and is fixed to the facing members 52A and 52B of the main holder 51a.

The lower auxiliary holder 51c is formed in a shape along the shape of the head portion 62a of the pipette 61, and is fastened to support the head portion 62a with multiple predetermined fastening members (not illustrated) and is fixed to the facing members 52A and 52B of the main holder 51a.

Note that in the case of simplification, the upper auxiliary holder 51b and the lower auxiliary holder 51c may be omitted.

Additionally, the main holder 51a may include three or more partially cylindrical members. In this case, when the circumferential end surfaces of the partially cylindrical members are arranged to face each other with small gaps, the three or more partially cylindrical members form a cylindrical shape as a whole and an internal space with an inner peripheral shape corresponding to the outer peripheral shape of a predetermined portion (portion where the main holder 51a is attached) of the grip portion 62b of the pipette 61.

<Dispensing Robot>

Figure 2:
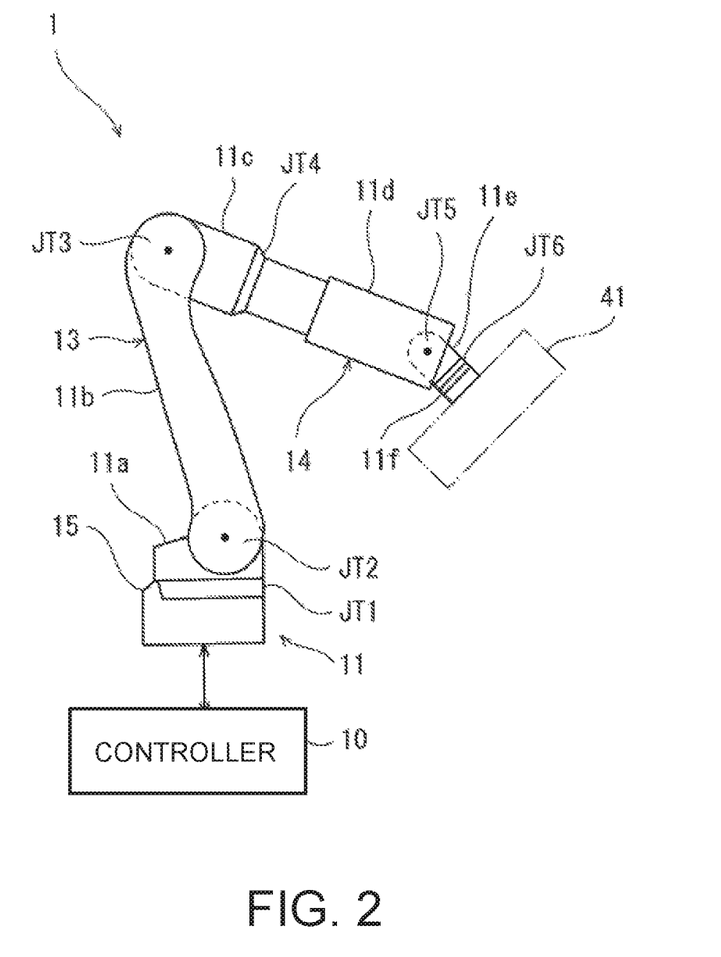
FIG. 2 is a diagram illustrating a schematic view of hardware configuration of a dispensing robot, such as in FIG. 1.

FIG. 2 is a schematic view illustrating hardware configuration of the dispensing robot of FIG. 1. Reference to FIG. 2 shows that the dispensing robot 1 includes the robot arm 11, the hand 41 attached to the distal end of the robot arm 11, and a controller 10. The robot arm 11 and the controller 10 constitute the dispensing robot 1.

{Robot Arm}

The robot arm 11 includes a base 15, an arm part 13 supported by the base 15, a wrist part 14 supported by the distal end of the arm part 13, and a hand 41 as an end effector attached to the wrist part 14. Here, the hand 41 as an end effector may be attached in advance to the wrist part 14 supported by the distal end of the arm part 13 of the robot arm 11 or may be attached separately.

The robot arm 11 is an articulated robot arm having three or more joints JT1 to JT6 and is manufactured by sequentially connecting multiple links 11a to 11f, as illustrated in FIG. 2. More specifically, in the first joint JT1, the base 15 and the proximal end portion of the first link 11a are connected so as to be rotatable around an axis extending in the vertical direction. In the second joint JT2, the distal end portion of the first link 11a and the proximal end portion of the second link 11b are connected so as to be rotatable around an axis extending in the horizontal direction. In the third joint JT3, the distal end portion of the second link 11b and the proximal end portion of the third link 11c are connected so as to be rotatable around an axis extending in the horizontal direction. In the fourth joint JT4, the distal end portion of the third link 11c and the proximal end portion of the fourth link 11d are connected so as to be rotatable around an axis extending in the longitudinal direction of the third link 11c. In the fifth joint JT5, the distal end portion of the fourth link 11d and the proximal end portion of the fifth link 11e are connected so as to be rotatable around an axis orthogonal to the longitudinal direction of the fourth link 11d. In the sixth joint JT6, the distal end portion of the fifth link 11e and the proximal end portion of the sixth link 11f are connected so as to be capable of twisting rotation. The distal end portion of the sixth link 11f is detachably attached to the base portion 42a of the hand 41 as an end effector illustrated in FIG. 3A in which a mechanical interface is provided. The mechanical interface has a connector which can be electrically connected to the hand 41.

The arm part 13 of the robot arm 11 is formed of a linked body having joints and links together, including the above-described first joint JT1, the first link 11a, the second joint JT2, the second link 11b, the third joint JT3, and the third link 11c. In addition, the wrist part 14 of the robot arm 11 is formed by a linked body having joints and links together, including the above-described fourth joint JT4, the fourth link 11d, the fifth joint JT5, the fifth link 11e, the sixth joint JT6, and the sixth link 11f.

Each of the joints JT1 to JT6 is provided with a drive motor (not illustrated) as an example of an actuator for relatively rotating the two members connected by the joint. The drive motor is, for example, a servo motor which is servo-controlled via a servo amplifier by a control signal transmitted from the controller 10. In addition, each of the joints JT1 to JT6 is provided with a rotation angle sensor (not illustrated) for detecting the rotation angle of the drive motor and a current sensor (not illustrated) for detecting the current of the drive motor.

{Controller}

The controller 10 includes, for example, a processor and a memory. The controller 10 controls the operation of the robot arm 11 by the processor reading and executing a predetermined operation program stored in the memory. Specifically, the controller 10 includes, for example, a microcontroller, an MPU, an FPGA (Field Programmable Gate Array), a PLC (Programmable Logic Controller), a logic circuit, and the like. The controller 10 generates control signals for the arm part 13 and the wrist part 14 of the robot arm 11 using the detection signal of the rotation angle sensor and the detection signal of the current sensor as feedback signals, and then feedback-controls the operation of the arm part 13 and the wrist part 14. Moreover, the controller 10 controls the operation of the hand 41 of the robot arm 11 in accordance with the above-described predetermined operation program.

{Hand}

FIG. 3C is a perspective view illustrating a state where the pipette holding piece, to which the pipette tips are attached, is gripped by the hand of the dispensing robot of FIG. 1. FIG. 3D is a perspective view illustrating a state where the tip ejector of the pipette in FIG. 3C has been pressed to detach the pipette tips from the pipette. In FIGS. 3C and 3D, the up-down direction in the figures is taken as the up-down moving direction of the hand for convenience of explanation.

Reference to FIG. 3C shows that the hand 41 includes a main body part 42, the pipette holder 43, and the plunger driver 44. The main body part 42 and the plunger driver 44 are covered by a cover, but this cover is omitted in order to show the internal structure of the hand 41. The hand 41 has a reference coordinate system set (defined) for the control of the movement of the hand 41 by the controller 10. This reference coordinate system is a left-handed orthogonal coordinate system and, for example, the Y-axis coincides with the rotation axis for the twisting rotation of the sixth link 11f of the wrist part 14.

The main body part 42 is formed of a frame body formed in an inverted L shape. For example, the main body part 42 is formed such that a reference axis 201 of the hand 41 coincident with the Y-axis passes through the center of the base portion 42a, extends in the Z direction from the base portion 42a, and then extends in the Y direction. The base portion 42a is attached to the mechanical interface of the distal end portion of the sixth link 11f of the wrist part 14 of the robot arm 11. In this case, the base portion 42a is attached such that the reference axis 201 of the hand coincides with the rotation axis for the twisting rotation of the sixth link 11f of the wrist part 14. Hence, when the hand 41 takes the attitudes illustrated in FIGS. 3A to 3C, the X-axis direction, the Y-axis direction, and the Z-axis direction orient in the left-right direction, the up-down direction, and the front-rear direction, respectively, the X direction, the Y direction, and the Z direction orient in the left direction, the downward direction, and the forward direction, respectively, and the direction opposite to the X direction, the direction opposite to the Y direction, and the direction opposite to the Z direction orient in the right direction, the upward direction, and the backward direction, respectively.

Reference to FIGS. 3C and 3D shows that a distal end portion 42b of the main body part 42 is provided with the pipette holder 43. The pipette holder 43 is, for example, an air chuck. The air chuck includes a main body 47 fixed to the distal end portion 42b of the main body part 42. The main body 47 is provided with the pair of claw members 48 which can be separated and close to each other in the X-axis direction. The inner surfaces of the pair of claw members 48 are provided with the pair of respective plate-shaped contact members 49. FIG. 3C illustrates a state where the pair of claw members 48 are separated, and FIG. 3D illustrates a state where the pair of claw members 48 are close together to grip (sandwich) the pipette holding piece 51 attached to the pipette 61.

Reference to FIG. 3C shows that the plunger driver 44 is provided in the middle of the main body part 42. The plunger driver 44 is provided with a swinging arm 44a which is swingable (rotatable) around an axis parallel to the X-axis. The swinging arm 44a is driven by a not-illustrated drive motor via a gear reduction mechanism. The driven gear 44b is provided at the distal end portion of the swinging arm 44a. The driven gear 44b comes into contact with the operable part of the plunger 64 of the pipette 61 held by the pipette holder 43 and transmits the swinging drive force of the swinging arm 44a to the plunger 64 while performing driven rotation. As a result, the plunger 64 is linearly driven while avoiding the sliding between the swinging arm 44a and the plunger 64 in the case where the driven gear 44b is not provided in between.

<First and Second Contact Surfaces and Tip Detachment Detector>

Figure 6A:
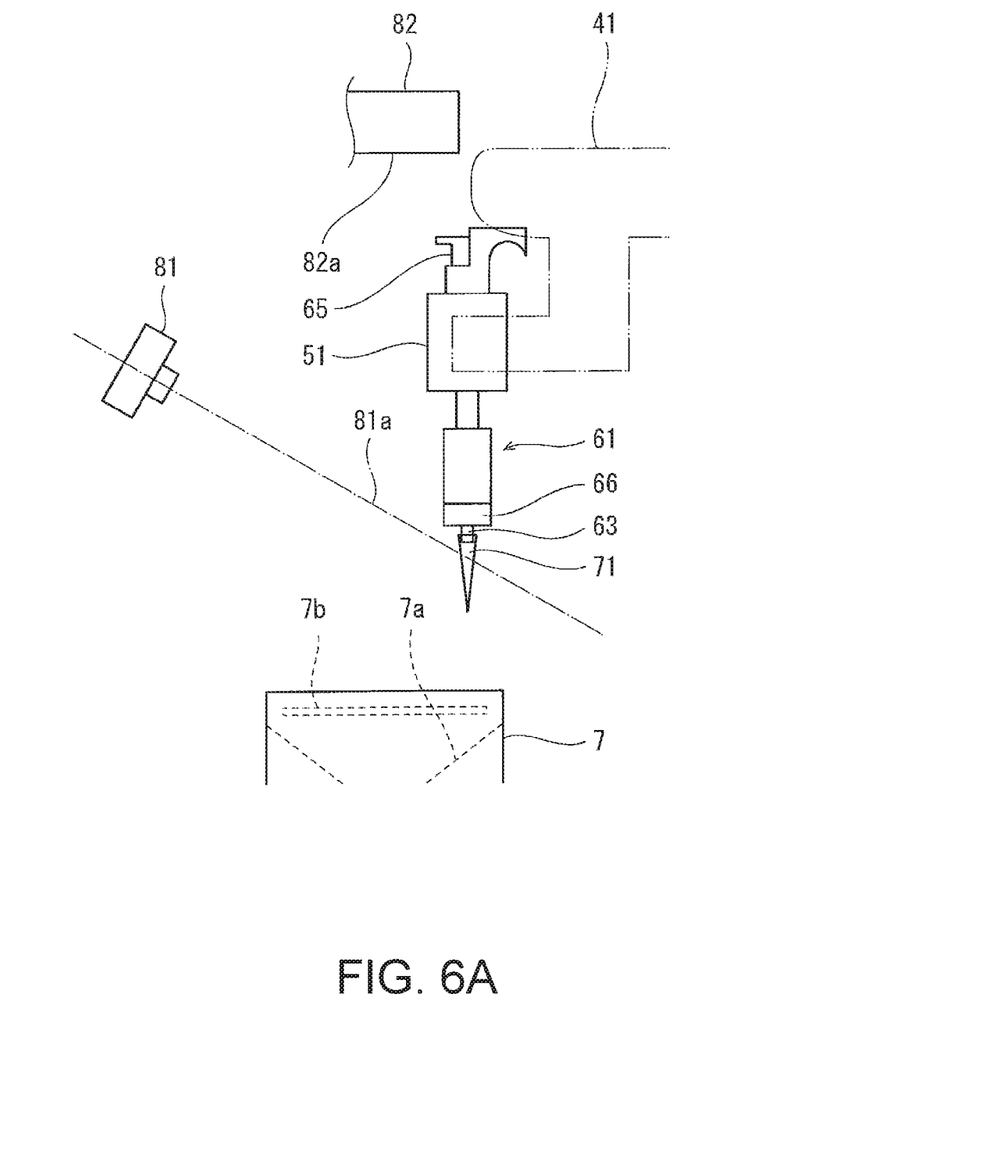
FIG. 6A is a diagram illustrating a schematic view of a state where a tip ejector is located below a first contact surface when a dispensing robot, such as in FIG. 1, is operated to bring an upper end of the tip ejector into contact with the first contact surface.
Figure 7A:
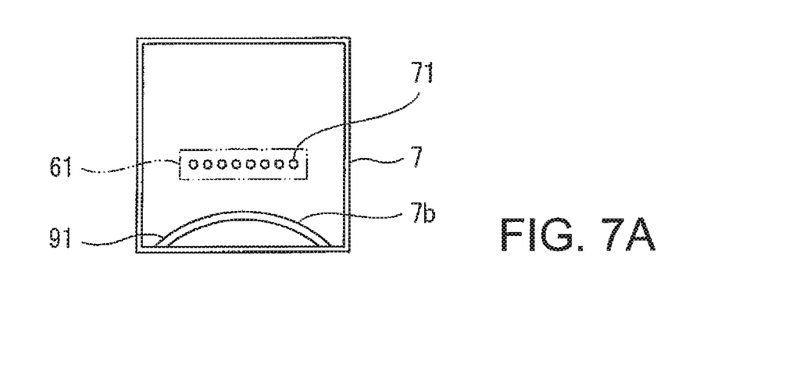
FIG. 7A is a diagram illustrating a schematic view of a state where pipette tips are located in front of a second contact surface when a dispensing robot, such as in FIG. 1, is operated to bring the pipette tips into contact with the second contact surface.

FIG. 6A is a schematic view illustrating a state where the tip ejector is located below a first contact surface when the dispensing robot of FIG. 1 is operated to bring the upper end of the tip ejector into contact with the first contact surface. FIG. 7A is a schematic view illustrating a state where the pipette tips are located in front of a second contact surface when the dispensing robot of FIG. 1 is operated to bring the pipette tips into contact with the second contact surface.

Reference to FIG. 1 and FIG. 6A shows that a portion of the first contact member 82 is provided at a position above the trash box 7. The first contact member 82 is configured to include, for example, a support stood at an appropriate position of the assay robot system 100 of FIG. 1 and an arm which protrudes above the trash box 7 from the top of the support in the horizontal direction. Here, the lower surface of the arm of the first contact member 82 is the first contact surface 82a. Here, the first contact surface 82a is oriented in the downward direction. However, the orientation of the first contact surface 82a is not limited to this, and may be oriented in the obliquely downward direction. This is because, even when the first contact surface 82a is oriented obliquely downward, the tip ejector 65 can be pressed and the pipette tips 71 are removed from the pipette 61 when the tip ejector 65 of the pipette 61 comes into contact with the first contact surface 82a.

In addition, a tip detachment detector 81 is provided at a height between the trash box 7 and the first contact surface 82a. The tip detachment detector 81 is, for example, a camera such as digital camera, a laser sensor, a combination of a light emitting element and a light receiving element, and the like. Here, the tip detachment detector 81 includes a camera. This camera is provided such that an optical axis 81a passes through a predetermined imaging region. This predetermined imaging region is such a region that, if the hand 41 is positioned at the tip detachment check position, the middle portion of the eight pipette tips 71 attached to the eight tip attachment members 63 of the pipette 61 held by the hand 41 is positioned. Although the tip detachment check position can be set to any position in this case, it is a position which is above the trash box 7 and at which the tip ejector 65 of the pipette 61 held by the hand 41 is located below the first contact surface 82a and the plunger is not located below the first contact surface 82a. The reason for this is to use the tip detachment check position as a standby position for bringing the tip ejector 65 into contact with the first contact surface 82a. The camera captures an image of a predetermined imaging region, that is, an image in which the pipette tips 71 are undetached or have been detached from the pipette 61 held by the hand 41 located at the tip detachment check position, and then transmits the image data to the controller 10.

Reference to FIGS. 1, 6A, and 7A shows that the trash box 7 is formed in a rectangular parallelepiped shape. A chute 7a is formed in a funnel shape inside the trash box 7 at a position lower by a certain height from the upper end of the trash box 7. In addition, a second contact member 7b is provided on the inner surface of one face of the trash box 7 so as to be located above the chute 7a. The second contact member 7b extends horizontally in an arc shape and is provided so that both ends thereof are connected to that face of the trash box 7. The front surface of the second contact member 7b corresponds to the second contact surface 91. Here, the "forward direction" refers to the direction of the normal line in the middle of the arc shape of the second contact member 7b.

<Configuration of Control System>

Figure 4:
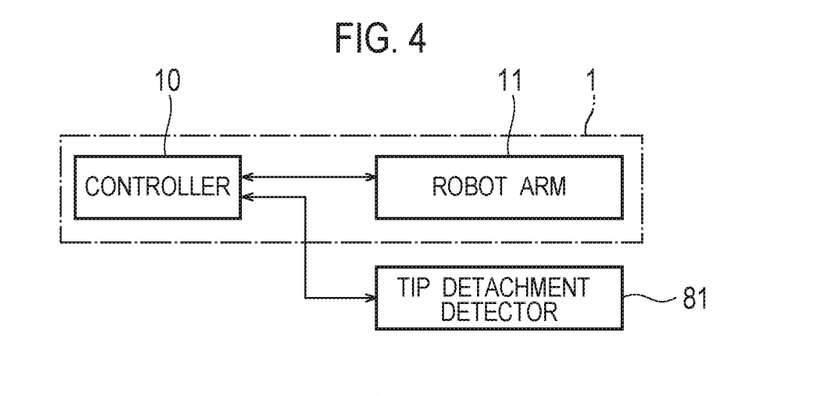
FIG. 4 is a block diagram illustrating the configuration of a control system of a dispensing robot, such as in FIG. 1.

FIG. 4 is a block diagram illustrating the configuration of the control system of the dispensing robot of FIG. 1. Reference to FIG. 4 shows that controller 10 controls the robot arm 11. In addition, the controller 10 detects whether or not the pipette tips 71 have been detached from the pipette 61 based on a detection signal from the tip detachment detector 81. Specifically, the controller 10 detects whether or not the pipette tips 71 have been detached from the pipette 61 by controlling the operation of the camera as the tip detachment detector 81 and performing image processing on the image data sent from the camera.

[Operations]

Next, a description is provided for the dispensing operation of the assay robot system 100 and the dispensing robot 1 configured as described above. Since the dispensing work itself is well-known, the operation related to one or more embodiments is mainly explained here.

Reference to FIGS. 1 and 3C shows that the dispensing robot 1 and the transporting robot 2 perform a series of dispensing operations using the plate stocker 17, the reagent reservoir 3, the tip rack 4, the measuring instrument (not illustrated), the washer 6, and the like while sharing their own roles.

In this series of dispensing operations, the dispensing robot 1 press-fits the tip attachment members 63 of the pipette 61 held in the hand 41 to the pipette tips 71 on the tip rack 4, and attaches the pipette tips 71 to the tip attachment members 63. Then, the dispensing robot 1 performs predetermined processing operation using these pipette tips 71. When the predetermined processing operation is completed, the dispensing robot 1 detaches the pipette tips 71 from the pipette 61 on the trash box 7 and discards them in the trash box 7.

Figure 5:
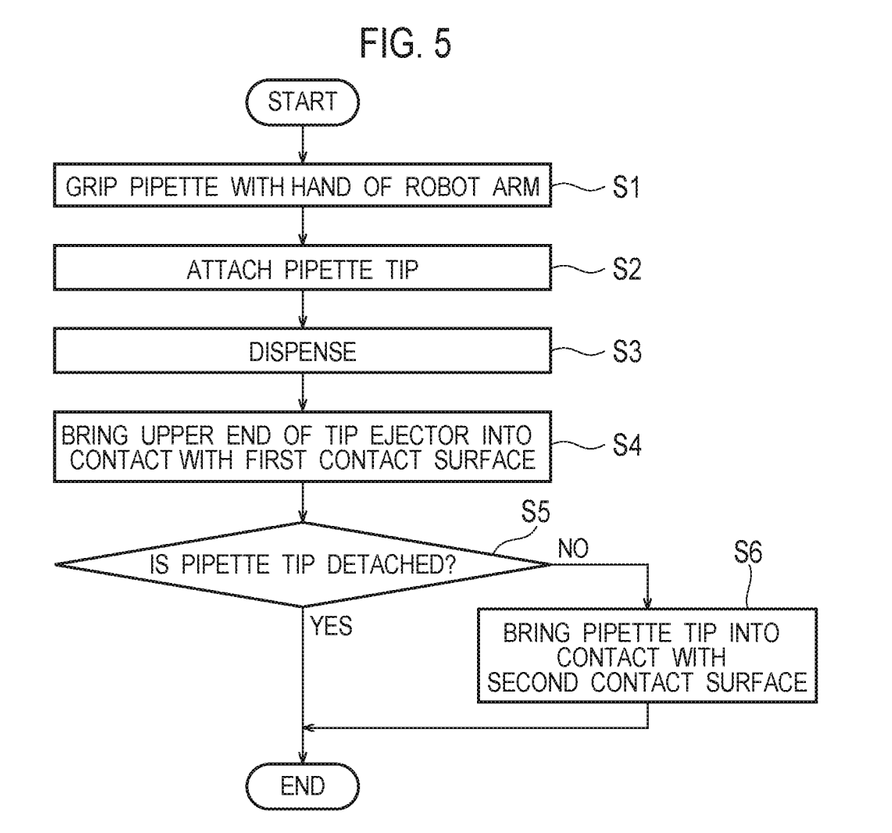
FIG. 5 is a flowchart illustrating the dispensing operation of a dispensing robot, such as in FIG. 1.

Next, a description is provided in detail for this dispensing operation (control method) of the dispensing robot 1. FIG. 5 is a flowchart illustrating the dispensing operation of the dispensing robot 1 of FIG. 1. The operation of this dispensing robot 1 is achieved by the controller 10 executing a predetermined control program (operation program).

Reference to FIGS. 3C and 3D shows that the dispensing robot 1 holds the main holder 51a of the pipette holding piece 51 attached to the pipette 61 with the pair of contact members 49 of the pair of claw members 48 of the air chuck of the pipette holder 43 of the hand 41. Here, the member 52A among the facing members 52A and 52B of the main holder 51a is positioned on the Z direction side, and the pair of contact members 49 grip the side surfaces each of which has a gap between the opposing end surfaces of the octagonal pillar part of the facing members 52A and 52B. As a result, the pipette 61 held by the hand 41 extends in the Y-axis direction and the front face of the pipette 61 is oriented in the Z-direction.

Reference to FIGS. 3B, 3C, and 5 shows that the dispensing robot 1 first grips the pipette holding piece 51 attached to the pipette 61 with the hand 41 of the robot arm 11, thereby holding the pipette 61 (step S1).

Subsequently, the dispensing robot 1 attaches the pipette tips 71 as described above (step S2).

Subsequently, the dispensing robot 1 dispenses as described above (step S3). Here, the dispensing robot 1 swings the swinging arm 44a downward to a predetermined position in advance and swings the swinging arm 44a upward. Then, the plunger 64 is ascended by the compression spring, and dispensing target liquid is aspirated into the pipette tips 71. After that, the dispensing robot 1 swings the swinging arm 44a downward to a predetermined position. This causes the plunger 64 to descend and the dispensing target liquid to be discharged from the pipette tips 71.

Figure 6B:
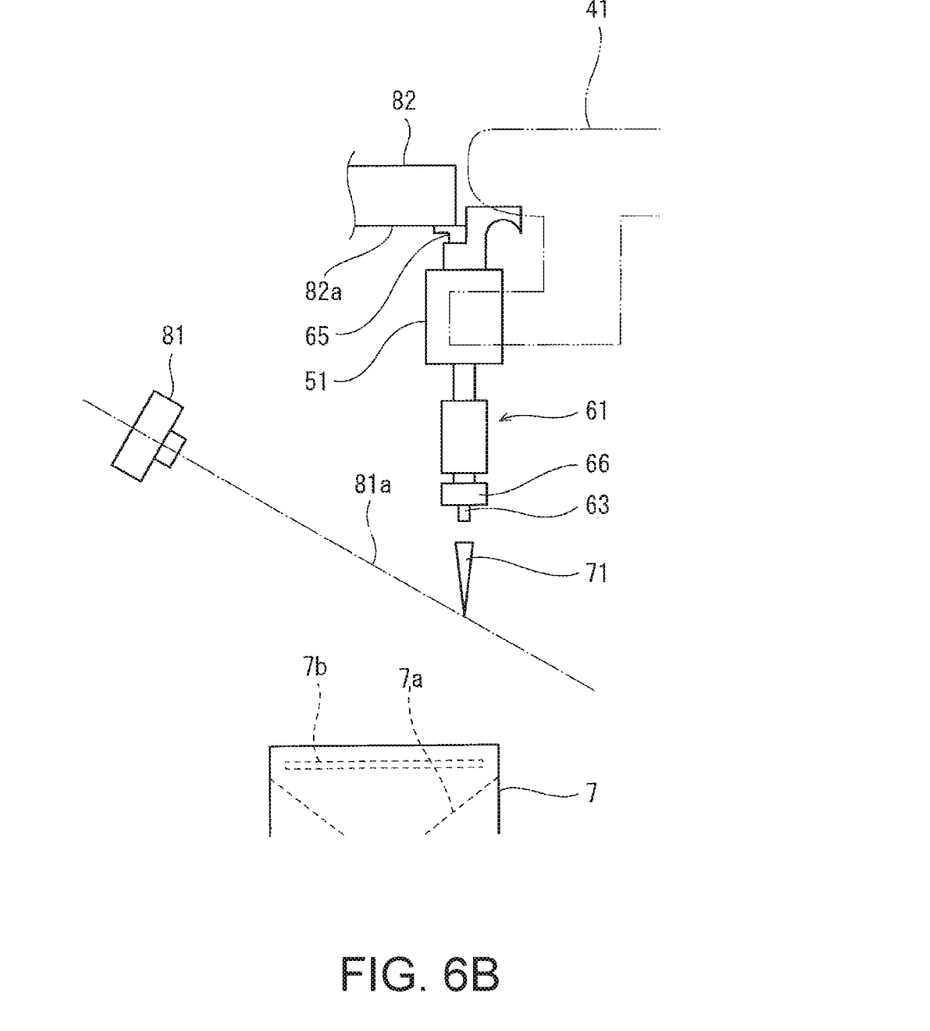
FIG. 6B is a diagram illustrating a schematic view of a state where a tip ejector is pressed downward by a first contact surface when a dispensing robot, such as in FIG. 1, is operated to bring the upper end of the tip ejector into contact with the first contact surface.

Reference to FIGS. 6A to 6C and 5 shows that the dispensing robot 1 then brings the upper end of tip ejector 65 into contact with the first contact surface 82a (step S4). This operation may be performed in any way as long as the upper end of the tip ejector 65 can be brought into contact with the first contact surface 82a. Here, the operation is performed as illustrated in FIGS. 6A and 6B. First, as illustrated in FIG. 6A, the dispensing robot 1 positions the hand 41 at the above-described tip detachment check position. Subsequently, as illustrated in FIG. 6B, the dispensing robot 1 elevates and ascends the hand 41 and brings the upper end of the tip ejector 65 into contact with the first contact surface from the downward direction. Then, the pipette tips 71 are pressed by the pushing member 66 and detached from the tip attachment members 63. The detached pipette tips 71 fall into the trash box 7, slide down the chute 7a, and are discarded in the trash box 7.

Figure 6C:
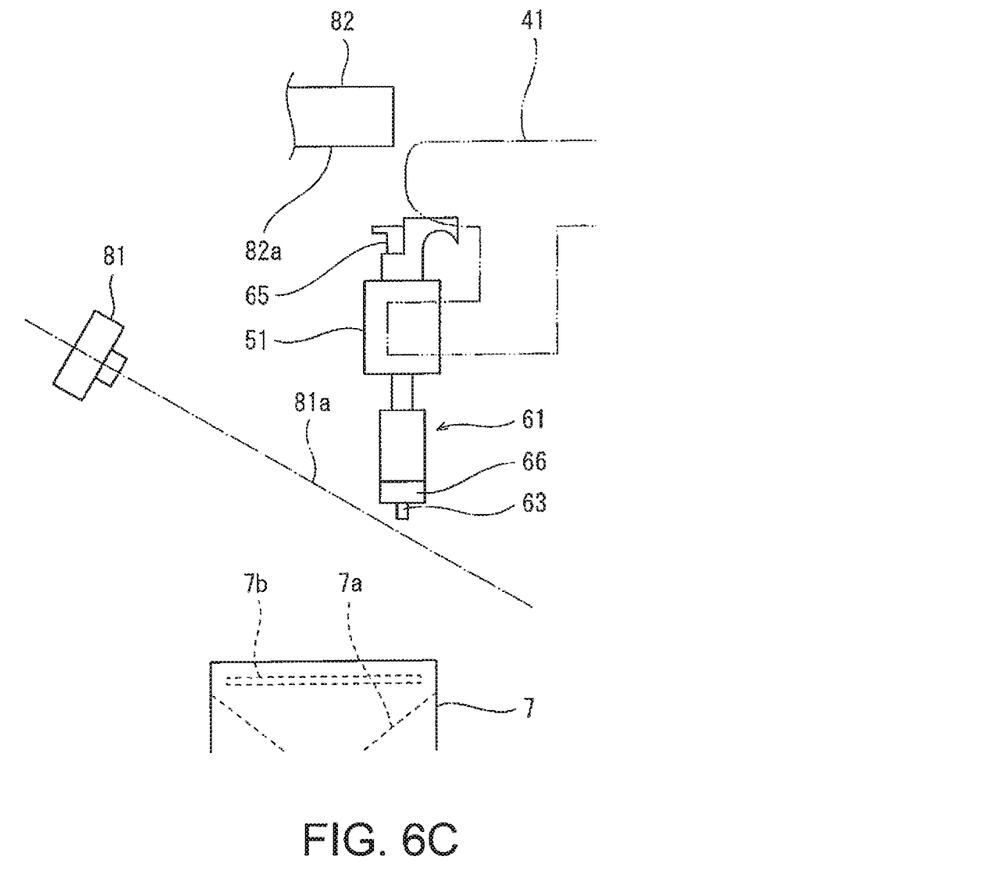
FIG. 6C is a diagram illustrating a schematic view of a state where a tip detachment detector is checking whether or not pipette tips have been detached from the pipette after a dispensing robot, such as in FIG. 1, brings the upper end of a tip ejector into contact with a first contact surface.

Subsequently, reference to FIGS. 6C and 5 shows that the controller 10 makes the dispensing robot 1 check whether or not the pipette tips 71 have been detached from the pipette 61 (step S5). The reason for this is because the pipette tips 71 are undetached from the pipette 61 with the probability of about 1/2000 according to the results of examination by the inventors and other people involving one or more embodiments. Specifically, the dispensing robot 1 positions the hand 41 at the tip detachment check position. Subsequently, the controller 10 makes the dispensing robot 1 allow the camera as the tip detachment detector 81 to capture the predetermined imaging region described above, and checks based on the image data whether or not the pipette tips have been detached from the pipette 61.

When all the pipette tips 71 are detached from the pipette 61 (YES in step S5), the dispensing robot 1 ends the dispensing operation.

Figure 7B:
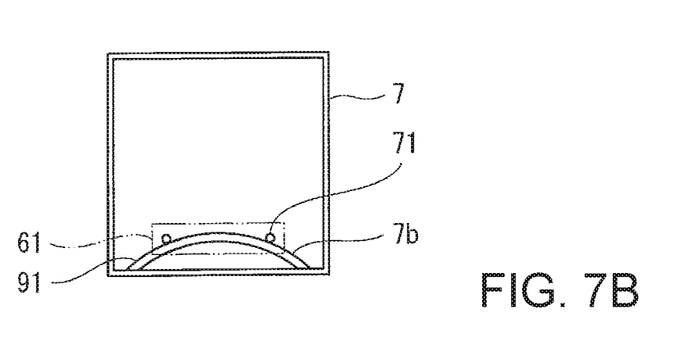
FIG. 7B is a diagram illustrating a schematic view of a state where some of multiple pipette tips located in the middle have collided with a second contact surface and fallen off when a dispensing robot, such as in FIG. 1, is operated to bring the pipette tips into contact with the second contact surface.

When at least one of the pipette tips 71 is undetached from the pipette 61 (NO in step S5), the dispensing robot 1 brings the pipette tips 71 into contact with the second contact surface 91 (step S6). More specifically, as illustrated in FIG. 7A, the dispensing robot 1 positions the distal end portions of the pipette tips 71, remaining in the pipette 61 held by the hand 41, in front of the second contact surface 91 which is the front surface of the second contact member 7b provided on the upper portion of the trash box 7. Subsequently, as illustrated in FIG. 7B, the pipette 61 is moved toward the second contact surface 91, and the distal end portions of the pipette tips 71 are brought into contact with the second contact surface 91. Then, in the order from the pipette tip 71 corresponding to the middle of second contact surface 91 to the pipette tips 71 corresponding to the outer portions, these pipette tips 71 are sequentially brought into contact with the second contact surface 91, and the multiple pipette tips 71 are sequentially detached. This makes it possible to detach the multiple pipette tips 71 with a small force.

Figure 7C:
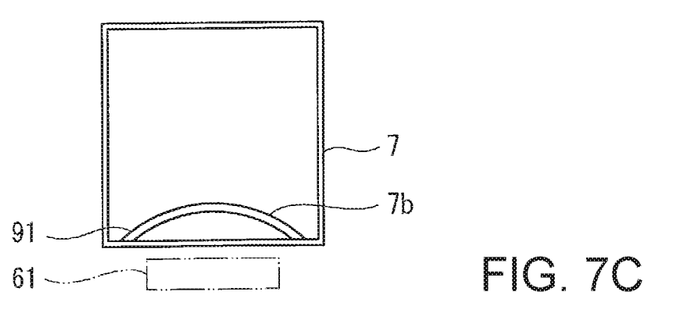
FIG. 7C is a diagram illustrating a schematic view of a state where all of multiple pipette tips have collided with a second contact surface and fallen off when a dispensing robot, such as in FIG. 1, is operated to bring the pipette tips into contact with the second contact surface.

Subsequently, as illustrated in FIG. 7C, the dispensing robot 1 moves the pipette 61 through the second contact surface 91. Thereby, all the pipette tips 71 are detached from the pipette 61.

Subsequently, the dispensing robot 1 ends the dispensing operation.

As described above, according to Embodiment 1, it is possible to perform an operation of detaching the pipette tips 71 from the pipette 61 using the dispensing robot 1. Plus, the robot arm 11 holds the pipette 61 when the hand 41 holds the pipette holding piece 51 attached to the pipette 61. For this reason, if the pipette holding piece 51 is designed to hold the commercially available manual type pipette 61 with a predetermined accuracy, it is possible to hold the commercially available manual type pipette 61 with the predetermined accuracy. Hence, use of the commercially available manual type pipette 61 makes it possible to carry out dispensing work with a good accuracy.

Moreover, the tip detachment detector 81 is used to detect that the pipette tips 71 are undetached from the pipette 61 even if the pipette tips 71 are undetached from the pipette 61 when the tip ejector 65 is pressed. Simultaneously, the robot arm 11 brings the distal end portions of the pipette tips 71 into contact with the second contact surface 91 in the forward direction of the second contact surface 91 in a plan view. As a result, the undetached pipette tips 71 are detached from the pipette 61. Therefore, it is possible to appropriately perform the operation of detaching the pipette tips 71 from the pipette 61.

In addition, the pipette holding piece 51 includes the main holder 51a formed of the partially cylindrical members 52A and 52B which, when both circumferential end surfaces are arranged to face each other with small gaps, form a cylindrical shape as a whole and an internal space with an inner peripheral shape corresponding to the outer peripheral shape of the predetermined portion of the grip portion 62b of the pipette 61. Thus, the pipette holding piece 51 fits to the shape of the commercially available pipette 61. Therefore, it is possible to hold the commercially available manual type pipette 61 with a good accuracy.

Embodiment 2

In Embodiment 2 of the disclosure, the trash box 7 illustrated in FIGS. 7A to 7C does not include the second contact member 7b and omits the detachment check operation of the pipette tips 71 illustrated in FIG. 5 (step S4) and the operation of bringing the pipette tips 71 into contact with the second contact surface 91 (step S5). The other respects are the same as Embodiment 1.

OTHER EMBODIMENTS

In Embodiment 1, the second contact surface does not necessarily have an arc shape and may have an extended surface in a plan view.

From the above description, many modifications and other embodiments of the disclosure are apparent to those skilled in the art. Accordingly, the above description should be construed as illustrative only, and is provided for the purpose of teaching those skilled in the art the best mode of carrying out one or more embodiments. It is possible to substantially change the details of the structure and/or function without departing from the spirit of the disclosure.

The dispensing robot and its control method of one or more embodiments make it possible to perform an operation of detaching tips from the pipette and moreover are useful as a dispensing robot and its control method capable of dispensing using a commercially available manual type pipette.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. An assay robot system comprising:
a first contact member having a first contact surface facing a downward vertical direction or an obliquely downward vertical direction;
a dispensing robot configured to operate a pipette to attach a tip to a lower end of the pipette and to operate the pipette to detach the attached tip from the lower end of the pipette by pressing a tip ejector;
a second contact member having a second contact surface;
a tip detachment detector that detects whether the tip has been detached from the pipette; and
a controller configured to control operation of the dispensing robot such that:
the dispensing robot holds the pipette with the tip attached thereto;
the dispensing robot elevates the pipette such that the tip ejector is pressed by bringing an upper end portion of the tip ejector into contact with the first contact surface of the first contact member; and
the dispensing robot moves the pipette horizontally toward the second contact member so as to detach the tip by contacting with, by the horizontal movement, the second contact surface of the second contact member in response to the tip detachment detector detecting that the tip is undetached from the pipette after the tip ejector has been pressed.

2. The assay robot system according to claim 1, wherein :
the second contact surface extends in a shape of an arc; and
the controller controls the dispensing robot such that, when controlling the dispensing robot such that the dispensing robot brings the distal end portion of the tip into contact with the second contact surface, the dispensing robot brings the distal end portion of the tip into contact with the second contact surface in a middle of the second contact surface.

3. The assay robot system according to claim 1, wherein the dispensing robot comprises a pipette holding piece comprising a holder formed of partially cylindrical members, and
circumferential end surfaces of the partially cylindrical members are arranged to face each other such that the partially cylindrical members form a cylindrical shape as a whole, and an internal space with an inner peripheral shape corresponding to an outer peripheral shape of a predetermined portion of a grip portion of the pipette.

4. A method of controlling an assay robot system, the method comprising:
controlling a dispensing robot to hold a pipette with a tip attached thereto;
controlling the dispensing robot to elevate the pipette such that a tip ejector is pressed by bringing an upper end portion of the tip ejector into contact with a first contact member having a first contact surface facing a downward vertical direction or an obliquely downward vertical direction;
detecting whether the tip has been detached from the pipette after the tip ejector has been pressed; and
controlling the dispensing robot to move the pipette horizontally toward a second contact member having a second contact surface so as to detach the tip by contacting with, by the horizontal movement, the second surface of the second contact member in response to detecting that the tip is undetached from the pipette after the tip ejector has been pressed.

5. The method of controlling the assay robot system according to claim 4, further comprising:
causing the controller to control the dispensing robot comprising causing the controller to control the dispensing robot such that, when controlling the dispensing robot such that the dispensing robot brings the distal end portion of the tip into contact with the second contact surface extending in a shape of an arc, the dispensing robot brings the distal end portion of the tip into contact with the second contact surface in a middle of the second contact surface.

6. The method of controlling the assay robot system according to claim 4, wherein
the dispensing robot comprises a pipette holding piece comprising a holder formed of partially cylindrical members, and
circumferential end surfaces of the partially cylindrical members are arranged to face each other such that the partially cylindrical members form a cylindrical shape as a whole, and an internal space with an inner peripheral shape corresponding to an outer peripheral shape of a predetermined portion of a grip portion of the pipette.

7. A dispensing method carried out by the assay robot system according to claim 1 comprising:
holding a pipette holding piece attached to the pipette with a hand of a robot arm of the dispensing robot;
attaching the tip to the pipette by moving the pipette so as to insert the pipette to the tip;
dispensing liquid using the pipette to which the tip is attached; and
detaching the tip used for dispensing the liquid from the pipette by moving the pipette so as to bring the tip ejector of the held pipette into contact with the first contact member.

8. The dispensing method according to claim 7, the method further comprising:
detecting, using the tip detachment detector, whether the tip has been detached from the pipette after the tip ejector is contacted with the first contact member; and
in response to the tip detachment detector detecting that the tip is undetached from the pipette after the tip ejector has been contacted with the first contact member, using the dispensing robot to move the pipette horizontally toward the second contact member so as to detach the tip by contacting the tip, by the horizontal movement, with the second contact surface of the second contact member.

* * * * *